United States Patent Office 3,411,724
Patented Nov. 19, 1968

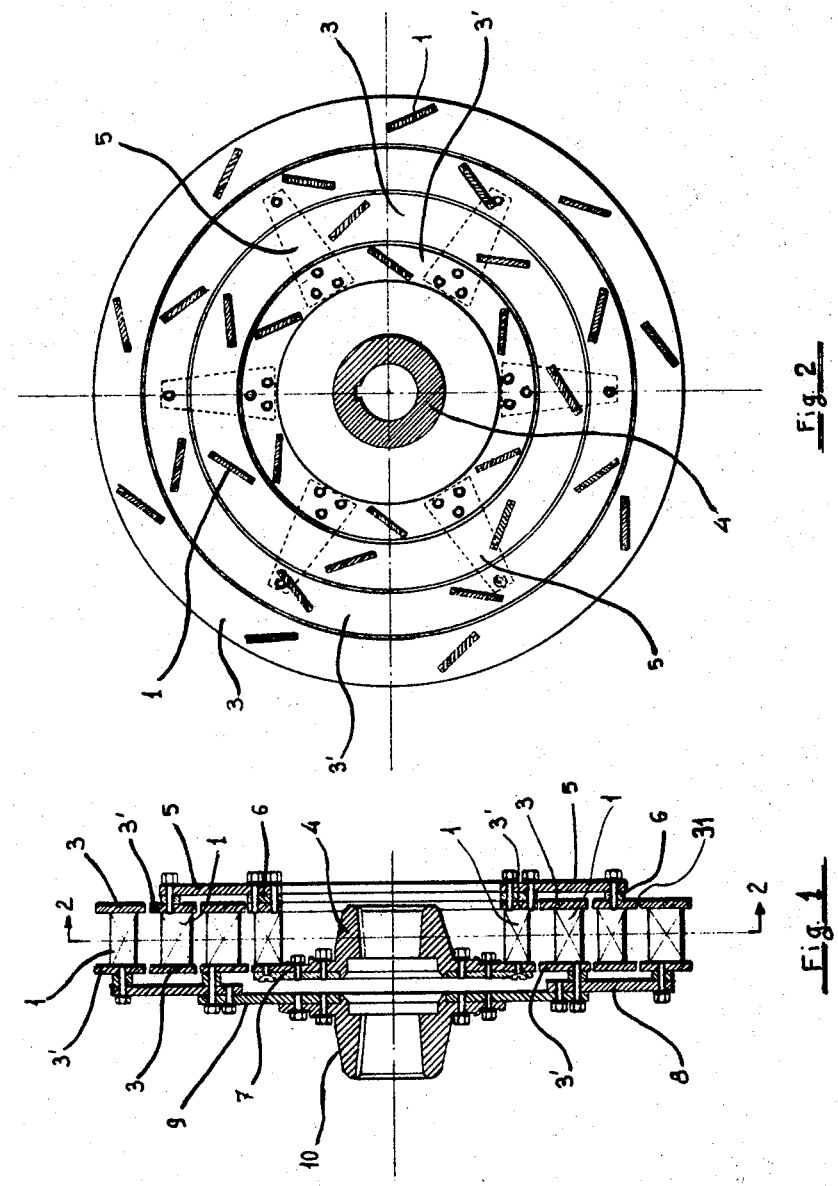

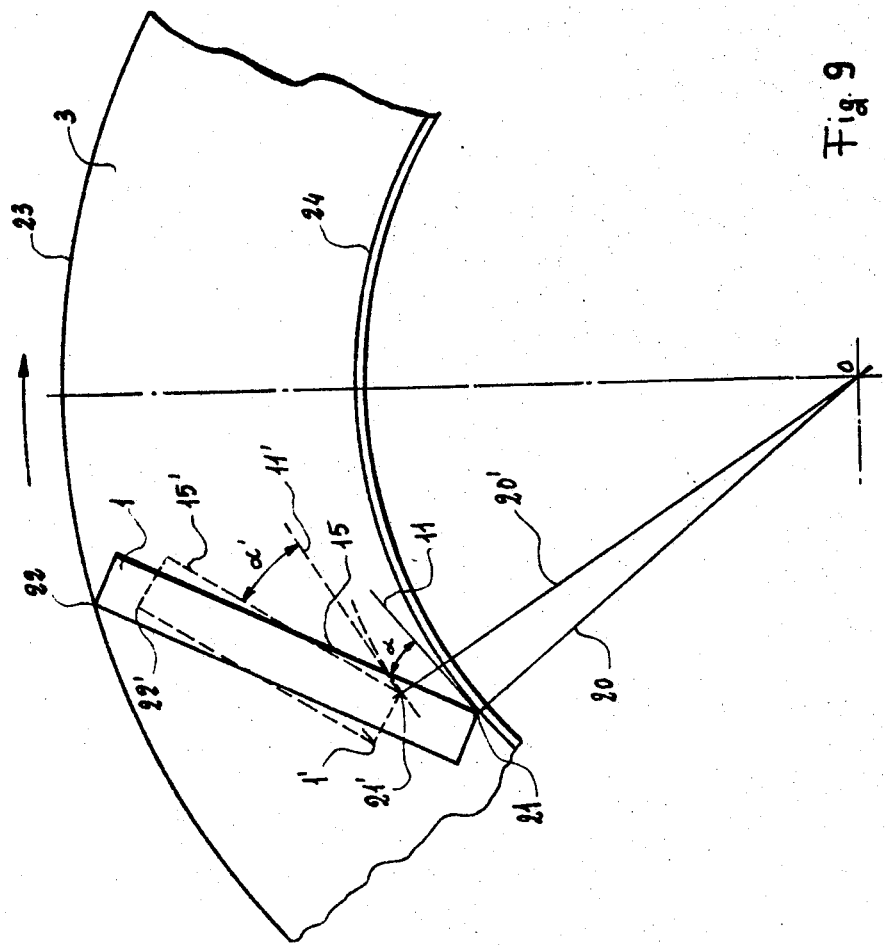

3,411,724
CAGE TYPE DISINTEGRATOR WITH BLADE SHAPED IMPACTING MEMBERS, PARTICULARLY SUITED FOR PROCESSING HARD MATERIALS
Luigi Noé, Milan, Italy, assignor to Sviluppo Silicalcite S.p.A., Milan, Italy
Filed May 16, 1966, Ser. No. 550,360
Claims priority, application Italy, May 29, 1965, 11,999/65; July 8, 1965, 15,271/65; Feb. 28, 1966, 4,437/66
10 Claims. (Cl. 241—188)

ABSTRACT OF THE DISCLOSURE

In a cage type disintegrator having concentric rows of supported impacting members, the improvement comprising impacting members in the shape of blades, which blades are individually affixed at least at one of their ends to a corresponding support member, and which blades are individually angled toward their direction of rotation at an angle of from 5° to 55° between each active blade surface and the plane perpendicular to the radial plane containing the corner of said active surface in closest relationship to the axis of rotation. The active surfaces of the said blades are preferably substantially concave.

---

Figure 3:
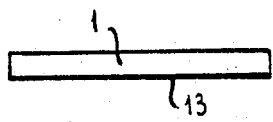
Figure 4:
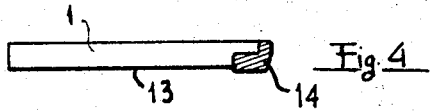
Figure 5:
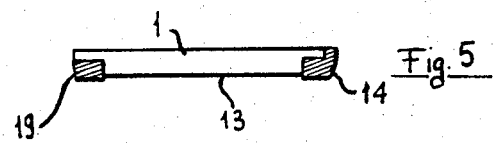

The present invention relates to a cage type disintegrator, the impacting means of which consist of blades assembled in concentric rows and which are angled towards the direction of rotation, so that a more efficient disintegrating action is developed. Moreover, the particular angular positioning of the blades permits of the establishment and maintenance during operation of a protective layer of the material undergoing disintegration upon the active surfaces of the blades. The disintegrator of this invention is particularly suited for the processing of granulated and/or powdery materials having hard structures, either dry or wet, such as, for example, sand or mixtures containing sand, and which ultimately can be used for the production of building materials.

According to one embodiment of this invention, the disintegrator blades are preferably concave at their active surfaces, which concavity permits of the more ready formation and maintenance upon the blades of the protective layer created by the material undergoing treatment in the disintegrator, as hereinbefore mentioned, and, consequently, protecting the disintegrator blades from the effects of wear.

Known cage type disintegrators have impact means consisting of cylindrical bars, plates or pegs of different cross sections, placed in concentric rows. These disintegrators, however, due to the wear suffered by their impact members, can effectively treat soft or semi-hard materials only. When treating hard materials therewith as, for example, sand or mixtures containing sand for the production of building materials or granulated ores, they exhibit the disadvantage of requiring frequent maintenance, as their impact means must be repaired or replaced only after a few hours of service. Moreover, effective disintegrating itself decreases during the machine operation, thus giving rise to further practical and economic disadvantages.

Accordingly, it is an object of this invention to provide a cage type disintegrator having more durable impact means. For example, in the comminution of a sand-lime wet mixture, carried out with a disintegrator according to this invention, it is possible to let the machine run for a very long time, not less than 8 hours, without the necessity for the repair and/or replacement of the impacting members.

The marked decrease in abrasive wear of all of the impacting members affords, furthermore, negligible pollution of the processed material, due to the material out of which the disintegrator blades are constructed. This latter phenomenon is particularly important when dealing with materials that must be kept substantially entirely pure.

Another object of this invention is to permit the longer continuous operation of the disintegrator, consequently affording practical and economic advantages in continuous processes.

Yet another object is to attain the same degree of disintegration with impacting means of considerably lower weights, and to provide a disintegrator requiring less power to run.

A still further object is to provide disintegrating efficiency and uniformity throughout the entire operation of the disintegrator. These and other advantages are attained by a cage type disintegrator with impacting means placed in concentric rows and consisting of blades fixed at least at one end to a revolving support member, the blades of every row being angled towards the direction of rotation in such a way that each active blade surface forms an angle of from 5° to 55° with the plane perpendicular to the radial plane containing the corner of said active surface in closest position to the axis of rotation; and driving and connecting means being provided for the actuation of the blade support members.

Figure 6:
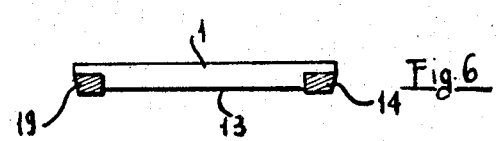
Figure 7:
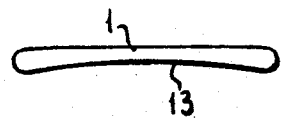
Figure 8:
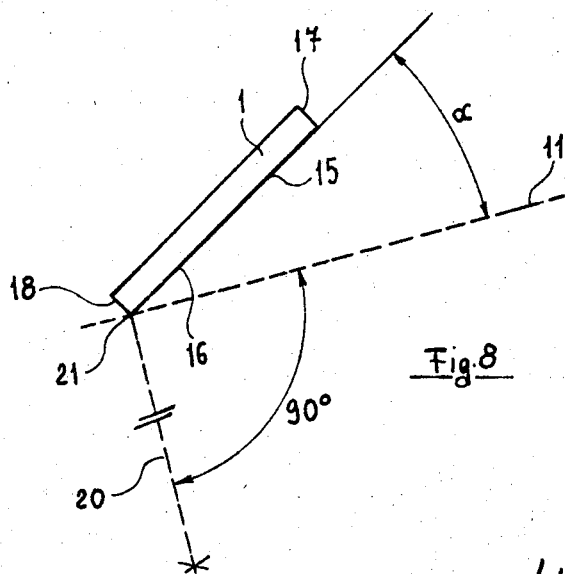

The present invention will now become more apparent by means of the following description with reference to the enclosed drawings wherein the same numerals designate equal or equivalent parts, and in which FIG. 1 schematically depicts a longitudinal section, taken in the direction of the axis of rotation, of a disintegrator according to a particular embodiment in accordance with this invention, FIG. 2 schematically depicts a cross section of FIG. 1, along line 2—2, FIGS. 3 to 7 schematically depict impact blades sections transverse to the axis of rotation, these blades being particular embodiments according to this invention, FIG. 8 schematically depicts the cross-section of an impact blade arranged in angled position on an annular row of blades, FIG. 9 schematically depicts a section of an annular blade support member taken along a sectional plane perpendicular to the cage rotation axis and passing through said annular member.

Referring to the above drawings, it can be seen that the disintegrator according to this invention consists of four concentrically assembled rows, or cages, of blades with substantially rectangular shape 1 (FIG. 1). The blades of each row are attached at their ends by means of screws, often omitted in the drawings for simplicity, to a pair of concentric and parallel annular plates or rings 3, 3'.

The blades of the most internal row have an end secured at 3' and the other end fixed at hub 4. Spokes 5 connect two alternate blade supporting rings radially. Connection with rings 3' is made by screws through suitable spacers 6. A supporting shoulder in the form of an annular plate 7 is secured at hub 4.

Hub 4, spokes 5, the corresponding concentric rows of blades and all other parts unitedly assembled set up the disintegrator's inner rotor.

Number 8 denotes the spokes radially connecting the remaining annular rows of blades together, similar to the above specified arrangement. These spokes are in turn screw fixed to ring shaped plate 9 fastened to hub 10. Hub 10, plate 9, spokes 8 and all other parts unitarily assembled set up the disintegrator's outer rotor. Hubs 4 and 10 rotate through two in-line positioned shafts operated by motors not shown in the drawings for the sake of simplicity.

All pairs of rings 3, 3' lay in some planes perpendicular to the rotation axis of both rotor assemblies and are also coplanar with ring 3' and hub 4 of the most internal row of blades. By such an arrangement, the material fed by means of a chute not shown in the drawing, between hub 4 and the most internal row of blades 1, is hurled outwardly as an effect of consecutive impacts against blades 1 without leakage from annular rings 3 and 3', which have a very small interstice 31.

Such an arrangement of rings 3 and 3' permits the homogenous operation on all the material fed into the disintegrator.

Blades 1 are placed along their concentric circumferences (FIG. 2), with the active surface angle towards the direction of rotation, in such a way as to form an angle α with plane 11 (FIG. 8) perpendicular to radial plane 20 containing corner 21, of blade 1 in the closest position to the axis of rotation this affords efficacious and uniform disintegrating action and permits the formation and maintenance of a protective layer of the material undergoing treatment during disintegrator operation.

Because of the formation of this layer, the effects of impact are manifested predominantly at the surface of the formed layer, and, consequently wearing of the blades is reduced to a great extent.

It has been found that in order to obtain the above mentioned efficient and uniform disintegrating action, angle α must be kept from between 5° and 55°, and preferably from between 20° and 30°.

FIG. 3 shows a section of rectangular blade 1 with a flat active surface, according to a particular embodiment of this invention.

FIGS. 4, 5, 6 and 7 depict other alternatives of the blades of this invention. Active surface 13 of blades 1 can be reinforced at its outer area 15 (FIG. 8), parallel to the axis of rotation, by a member 14 preferably made out of hard material, for example, Widia-steel, stellite, titanium carbide, alloy steel and others with anti-wear properties. This member longitudinally extends for the length of the entire blade and constitutes the external edge 17 (FIG. 8) either fully (FIGS. 4 and 5) or partially (FIG. 6).

The inner area 16 and edge 18 (FIG. 8) of blade 1 can either be reinforced (FIGS. 5 and 6) or not (FIG. 4) by a similar strengthening member 19 made out of hard material.

As shown in the figures, the reinforcing member protrudes preferably from the active surface 13 of the blade, consequently allowing easier and steadier formation of the protecting layer, as an incident of the substantial cavity of surface 13. This particular embodiment supplies the further advantage of constant disintegration accuracy. Reinforcements 14 and 19 have longitudinal end edges preferably chamfered, as evidenced in the cited figures.

Surfaces of reinforcements 14 and 19 can, however, also be coplanar with surface 13 and have no chamfered edges.

FIG. 7 depicts a further form of blade patterned in a way that the active surface 13 is substantially concave with longitudinal end edges preferably rounded.

In the case of blades having an active surface 13 substantially concave the ideal surface joining the edges of said blade must be intended as the active blade surface in respect of which the angle α is calculated.

According to a preferred embodiment of this invention (FIG. 9), the transverse dimension of the blades is such that the end points of their sections, cut along the planes containing the above said annular support members and perpendicularly placed with respect to the cage rotation axis, substantially and respectively lay at the circumferences which define, inwardly and outwardly of said disintegrator, said annular support members of said blades.

The above permits of the reduction, with the same disintegrating effect of the total number of required impacting blades and to obtain a further reduction of the wear suffered by the disintegrator.

In fact, it has been noted that the wear suffered by the disintegrator metal parts substantially occurs, as far as blades are concerned, along the inner and outer edges of the same.

This important observation led, therefore, to the realization that the wear of the blades substantially depends only on the number of blades, not on their sectional dimensioning along a plane perpendicular to the cage rotation axis.

In FIG. 9 a blade 1 is shown whose transverse dimension substantially coincides, according to a preferred embodiment of the invention, with the width of the annular support member 3 (or 3') in the direction of the angle α of the blade; i.e., the end points 21 and 22 of the corner sections, or points of top overall dimension of the blade, lay as the figure shows, on the two circumferences that limit, one 23 outwardly and another 24 inwardly, with respect to the axis of rotation 0, the ring or support member 3. In the same FIGURE 9 a section of blade 1' is shown by a dotted line, which represents a blade according to this invention but having its transverse dimension less than the width of the annular support member 3 in the direction of angle α' of the blade.

It must be noted that in the two embodiments of this invention shown in FIGURE 9, corresponding or equivalent parts are indicated by the same numerals, either with or without superscripts.

The superior efficiency of the embodiment previously indicated to be preferred, is clearly shown in following Table 1 wherein results achieved by means of distinctive tests are recorded.

For the performance of such tests a disintegrator of the type shown in FIGURES 1 and 2 was used and submitted to two consecutive test cycles, one with equipment having blades formed corresponding to embodiment 1' (FIG. 9) with angle openings varying as in the following table, and another with equipment having blades corresponding to preferred embodiment 1 (FIG. 9) with the same angle openings.

Particularly, the disintegrator had two counter-rotating cages, one consisting of a hub and two pairs of rings or annular support members, the other of a hub and a single pair of rings which rotated between the two first mentioned pairs with counterdirected movement, and having the following assembly dimensions:

radius of hubs: 89 mm.
1st interstice: 4 mm.
width of the first pair of rings: 40 mm.
2nd interstice: 4 mm.
width of the second pair of rings: 50 mm.
3rd interstice: 4 mm.
width of the third pair of rings: 46 mm.

The interspace between the parallel faced surfaces of the two rings or support members forming a pair was 55 mm., said rings being coplanar in their own planes to the corresponding planes perpendicular to the axis of rotation.

Spokes connected said annular members alternately and radially together and with the hub of each cage, as schematically shown in above FIGURES 1–2.

The first test cycle was, moreover, carried out with 44 blades distributed among the three ring pairs as follows— starting from the inner to the outer pairs—10 on the 1st pair, 16 on the 2nd pair, 18 on the 3rd pair. The second test cycle was carried out with half the number of blades (22) distributed in the same order among the ring pairs: 5 placed on the 1st pair, 8 on the 2nd pair, 9 on the 3rd pair; the sectional length of the active surface 15' of each blade was equal for the first test cycle and corresponded to the maximum possible length complying with the arrangement object of this invention, less than a 55° angle, as above specified, being, on the contrary, the sectional length of the active surface 15 of each blade variable in the second test cycle, according to the angle opening value and corresponding to the maximum possible for each angle opening value, in accordance with this invention.

Other conditions and test data can be summarized as follows:

(a) Sand: 95% $SiO_2$, dried at constant weight.

(b) Mixture: sand and lime. Hydrated lime with CaO activity of 65% was used.

sand content: 84% by weight
lime content: 16% by weight
moisture of mixture: 7%

(c) Hourly capacity: 325 kg./h.

All tests involved a treatment of sand only, conforming to Point (a), which had to be mixed, after disintegrating, for the production of building material according to "sand-lime" technology, exception having been made for tests aiming to ascertain the consistence of the protection layer formed which were carried out on a sand-lime mixture with characteristics the same as specified at Point (b).

Table 1 specifically compares, as to these two test cycles, the values of the absolute specific surfaces attained (in cm.$^2$/g.) and the unit consistence, per cm.$^2$ of total impact blade surface, of the thickness of the protection layer formed (gr./cm.$^2$), as a function of the blade angular positioning in accordance with that above specified, and of the total number of blades equipping the disintegrator in each test.

By a perusal of the following table, it becomes clearly evident that the specific surface obtained, other values being equal, depends on the blade angle opening; it is also possible to see that the values of the specific surface achieved are better for a blade angle setting range of from 20° to 30°.

shown in the drawings: sand, 85%; lime, 15%; moisture, 28%.

The disintegrator features were: capacity 10 t./hr.; three concentric rows of blades numerically equaling 6, 9 and 12, respectively, from the inner to the outer row; angle opening α of the blades ranging from 26° for the inner to 24° for the outer blades; diameter of the outer circumference of blades 964 mm.; radial distance of blades circumferences 102 mm.; transverse dimension of blades 101 mm., longitudinal dimension of same 110 mm.

The machine functioned, with both rotors running at a speed of 1,500 r.p.m., for 90 hours, supplying efficient and uniform disintegrating action, and requiring no stop to repair impact means. A similar test—carried out with a disintegrator equipped with cylindrically shaped impact means with diameter equal to that of the circumference, ascribed to the transverse section of the blades used in the previous test—had to be stopped after five hours, as a consequence of function inefficiency.

*Example 2*

A disintegrator with six rows of blades, radially distanced 56 mm. among themselves, was submitted to a function test. The outer circumference row of blades had a diameter of 1052 mm. The inner circumference row included six blades angled α=26°, the second and third rows had each seven blades angle α=26° and 25° respectively, fourth and fifth rows had each eight blades angled α=25° and 24° respectively. The outer row included nine blades angled α=24°.

The transverse dimension of the blades was 71 mm., while the longitudinal dimension was 110 mm. The output of the machine was 10t/h.

The following materials were fed into said disintegrator: sand, 80%; lime, 20%; moisture, 28%.

The disintegrator ran with full efficiency for 60 hours with both rotors revolving at 1,500 r.p.m.

| Blade angle setting, degrees | Achieved specific surface in cm.$^2$/gr. | | Total number of blades | | Protection layer | |
|---|---|---|---|---|---|---|
| | Blades positioned 1' | Blades positioned 1 | Positioning 1' | Positioning 1 | Gr./cm.$^2$ of totally impacted surface under positioning 1' | Gr./cm.$^2$ of totally impacted surface under positioning 1 |
| 55 | 480 | 411 | 44 | 22 | 0.944·10$^{-2}$ | 0.845·10$^{-2}$ |
| 40 | 575 | 444 | 44 | 22 | 0.977·10$^{-2}$ | 1.405·10$^{-2}$ |
| 26 | 675 | 506 | 44 | 22 | 1.512·10$^{-2}$ | 1.923·10$^{-2}$ |
| 20 | 744 | 647 | 44 | 22 | 2.005·10$^{-2}$ | 2.515·10$^{-2}$ |
| 15 | 470 | 379 | 44 | 22 | 1.699·10$^{-2}$ | 2.380·10$^{-2}$ |

It can also be remarked that the specific surfaces achieved with blades of type 1 are comparable with the ones recorded by comparative tests in which the total number of blades used is half the number of blades applied for corresponding comparative tests.

In fact, the protective layer formed during tests carried out with blades of type 1 is more consistent and, consequently, more efficient than the corresponding layer obtained in comparative tests. Summing up, such preferred dimensioning, affording comparable specific surfaces, permits the reduction of the total number of blades and concomitant reduction in wear, such latter reduction being further improved by the better protection afforded by the layer of material, to which the advantages of higher structural simplicity and mechanical efficiency are to be added.

To illustrate further the present invention and the advantages thereof, the following specific examples are given, it being understood that these are merely intended to be illustrative and not limitative.

*Example 1*

The following materials (in this and in the following examples, percentages are given in weight of dry mixture) were continuously fed to a disintegrator the same as that

*Example 3*

The following materials: sand, 80%; lime, 20%; moisture, 15%; aluminium powder, 0.3 kg./t. of dry mixture; were fed into a disintegrator equipped with four rows of blades. The output of the machine was 9.5 t./hr.; the number of blades was 6 in the inner circumference, seven in the second, eight in the third and nine in the outer one.

The inner row had a diameter of 497 mm., the radial interspace between the circumference of two neighbouring rows was 87.1 mm., while the diameter of the circumference ascribed to the transverse section of each blade was 118 mm. and the longitudinal dimension of the blades was 110 mm.

The blades were angles at 26° to 24° from inner to outer position. Both rotors were actuated at 900 r.p.m.

The disintegrator functioned in a fully efficient manner for 75 hours when equipped with Widia-steel reinforced blades and for 8 hours with blades having no reinforcing member, against the four service hours permitted by similar disintegrators with cylindrical bars.

As many variations of this invention may be made without departing from the spirit and scope thereof, it is to be understood that the invention is not limited to the specific embodiments thereof, except as defined in the appended claims.

What is claimed is:

1. In a cage type disintegrator having concentric rows of supported impacting members, the improvement comprising impacting members in the shape of blades, which blades are individually affixed at least at one of their ends to a corresponding support member, and which blades are individually angled toward their direction of rotation at an angle of from 5° to 55° between each active blade surface and the plane perpendicular to the radial plane containing the corner of said active surface in closest relationship to the axis of rotation.

2. The cage type disintegrator of claim 1, wherein the blades are individually angled toward their direction of rotation at an angle of from 20° to 30°.

3. The cage type disintegrator of claim 1, wherein the blades are individually angled toward their direction of rotation at an angle of from 24° to 26°.

4. The cage type disintegrator of claim 1, wherein the active surfaces of the said blades are substantially concave.

5. The cage type disintegrator of claim 1, wherein the outer edges of the said blades parallel to their axis of rotation are provided with reinforcing means.

6. The cage type disintegrator of claim 5, wherein the reinforcing means are selected from the group consisting of Widia-steel, stellite, titanium carbide and alloy steel.

7. The cage type disintegrator of claim 1, wherein both the inner and outer edges of said blades parallel to their axis of rotation are provided with reinforcing means.

8. The cage type disintegrator of claim 7, wherein the reinforcing means are selected from the group consisting of Widia-steel, stellite, titanium carbide and alloy steel.

9. The cage type disintegrator of claim 5, wherein the reinforcing means protrude from the active surface of the said blades to provide a substantially concave active surface.

10. The cage type disintegrator of claim 7, wherein the reinforcing means protrude from the active surface of the said blades to provide a substantially concave active surface.

References Cited

UNITED STATES PATENTS 1,772,974  8/1930  White _____ 241—188 X

FOREIGN PATENTS 267,293  11/1913  Germany.
285,830  5/1929  Great Britain.
59,814  5/1942  Denmark.

ANDREW R. JUHASZ, *Primary Examiner.*

FRANK T. YOST, *Assistant Examiner.*